United States Patent
Wisenöcker et al.

(10) Patent No.: US 8,370,227 B2
(45) Date of Patent: Feb. 5, 2013

(54) METHOD FOR MAINTAINING CONTINUITY OF 'DIAMETER' PROTOCOL-BASED ONLINE CHARGING

(75) Inventors: Richard Wisenöcker, Vienna (AT); Wei Hua Zhou, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 104 days.

(21) Appl. No.: 12/996,515

(22) PCT Filed: Jan. 20, 2009

(86) PCT No.: PCT/EP2009/050586
§ 371 (c)(1),
(2), (4) Date: Feb. 7, 2011

(87) PCT Pub. No.: WO2009/092704
PCT Pub. Date: Jul. 30, 2009

(65) Prior Publication Data
US 2011/0125620 A1 May 26, 2011

(30) Foreign Application Priority Data
Jan. 23, 2008 (CN) .......................... 2008 1 0003790

(51) Int. Cl.
*G06Q 40/00* (2006.01)
(52) U.S. Cl. ............................................ 705/30
(58) Field of Classification Search ............. 705/30
See application file for complete search history.

(56) References Cited

U.S. PATENT DOCUMENTS
2008/0147551 A1* 6/2008 Connelly ......................... 705/44

FOREIGN PATENT DOCUMENTS
EP 1265397 A2 12/2002
WO 2007/048336 A1 5/2007

OTHER PUBLICATIONS

3GPP, "3rd Generation Partnership Project", Technical Specification Group Service and System Aspects, Voice Call Continuity between CS and IMS Study, Release 7, Nov. 23, 2005, pp. 9, 39, 55, 58, 95 and 96.
International Search Report and Written Opinion for International Application PCT/EP2009/050586, mailed on Jun. 2, 2009, 12 pages.

* cited by examiner

*Primary Examiner* — Russell S Glass

(57) ABSTRACT

The present invention relates to a method for maintaining continuity of Diameter online charging. The method comprises the following steps: a) initializing, when a user is moving, the relocation of a prepayment client terminal from an old prepayment client terminal to a new prepayment client terminal, and implementing the re-authentication of a mobile station at the new prepayment client terminal; b) transmitting the context information of an old Diameter online charging session from the old prepayment client terminal to the new prepayment client terminal after the re-authentication has been successfully completed; c) transmitting an initial credit control request (CCR) message comprising the identification of the old Diameter online charging session from the new prepayment client terminal to a prepayment server for continuing the old Diameter online charging session, and request for a quota by a prepayment proxy to the prepayment server via the new prepayment client terminal; and d) disconnecting the old connection between the old prepayment client terminal and the prepayment server.

10 Claims, 5 Drawing Sheets

METHOD FOR MAINTAINING CONTINUITY OF 'DIAMETER' PROTOCOL-BASED ONLINE CHARGING

CROSS-REFERENCE TO RELATED APPLICATIONS

This application is a national stage entry of PCT Application No. PCT/EP2009/050586, filed on Jan. 20, 2009, entitled "METHOD FOR MAINTAINING CONTINUITY OF 'DIAMETER' PROTOCOL-BASED ONLINE CHARGING", which, in turn, claims the benefit of priority based on Chinese Application No. 200810003790.3, filed on Jan. 23, 2008, the disclosures of which are hereby incorporated by reference in their entirety.

TECHNICAL FIELD

The present invention relates to "Diameter" protocol-based online charging in wireless networks and, particularly, to a method for maintaining continuity of "Diameter" protocol-based online charging during the relocation of a prepayment client terminal.

BACKGROUND

Diameter Credit Control Application (DCCA) is a control protocol for online charging, which was designed by the Internet Engineering Task Force (IETF) and expanded by the $3^{rd}$ Generation Partnership Project (3GPP). DCCA is based on a client terminal (prepayment client terminal or PPC)/server (prepayment server or PPS) mode. Within DCCA, a PPC is designed as in the same network unit as an anchor point. When a user moves within a 3G network, since the anchor point of a GPRS gateway-supported node does not change, the PPC does not change. Therefore, it is not necessary to consider the issue of mobility while using such network architecture for charging, as shown in FIG. 1.

However, as the network becomes flatter and flatter, some online charging functions have been transferred to, for example, access points of an Access Service Network Gateway of a WiMAX network (ASN GW) instead of focusing only on anchor points, as shown in FIG. 2 which illustrates a Diameter online charging architecture in a WiMAX network. When a user is moving, the mobile station may move from one ASN GW/PPC to another ASN GW/PPC. In this case, the prepayment client terminal shall be relocated, and also the charging continuity shall be maintained to support the continuity of a user session. Current DCCA is obviously not capable of solving this problem.

SUMMARY

The task for the present invention is to solve the problem of continuous online charging based on the situation of a prepayment client terminal's relocation during Diameter protocol online charging.

According to one aspect of the present invention, a method for maintaining continuity of Diameter online charging during relocation of a prepayment client terminal is provided, which method comprises the following steps:

a) initializing, when a user is moving, the relocation of a prepayment client terminal from an old prepayment client terminal to a new prepayment client terminal and implementing the re-authentication of a mobile station at the new prepayment client terminal;

b) transmitting the context information of an old Diameter online charging session from the old prepayment client terminal to the new prepayment client terminal after the reauthentication has been successfully completed;

c) transmitting an initial credit control request message comprising the identification of the old Diameter online charging session from the new prepayment client terminal to a prepayment server for continuing the old Diameter online charging session, and request for a quota by the new prepayment client terminal to the prepayment server; and d) disconnecting the old connection between the old prepayment client terminal and the prepayment server.

In this method, the new CCR message is indicated as a special message after prepayment client terminal relocation by way of defining the type of the new CCR message or utilizing a special attribute value pair. The type of the new CCR message can be, for example, "continuously charging" apart from "initializing", "updating" and "finishing".

The prepayment client terminal relocation can be accomplished in a push or pull mode between the old prepayment client terminal and the new prepayment client terminal. Furthermore, the re-authentication of the mobile station can comprise an extended authentication protocol stage and a PKMv2 3WHS stage.

After the detection that the re-authentication process has been successfully completed, the new prepayment client terminal initializes R4 relocation to accomplish a transaction process. The R4 relocation to accomplish the transaction process comprises: by way of transmitting a relocation_finish_request message, the new prepayment client terminal informs the old prepayment client terminal of the successful completion of the re-authentication process; the old prepayment client terminal responds with a relocation_finish_respond message; and the old prepayment client terminal deletes the context of the mobile station upon receiving a relocation_finish_confirmation message. In this case, the new prepayment client terminal sets an "online charging context" bit in the context objective indicators to indicate the request for the context of the old prepayment client terminal. Furthermore, the relocation_finish_respond message provides a mobile station context including the context of the old prepayment client terminal.

After the old connection between the old prepayment client terminal and the prepayment server is disconnected, the new prepayment client terminal transmits a context report message to a prepayment proxy so as to use the location/identification/quota of the new prepayment client terminal to update the prepayment proxy.

According to another aspect of the present invention, it also provides a method for maintaining continuity of Diameter online charging during relocation of prepayment, which method comprises the following steps:

a) initializing, when a user is moving, the relocation of a prepayment client terminal from an old prepayment client terminal to a new prepayment client terminal and implementing the re-authentication of a mobile station at the new prepayment client terminal;

b) transmitting the context information of an old Diameter online charging session from the old prepayment client terminal to the new prepayment client terminal after the re-authentication has been successfully completed, and request for a quota by a prepayment proxy to a prepayment server via the new prepayment client terminal;

c) maintaining by the prepayment proxy the old quota and the new quota separately, and using the old quota continuously for online charging until the new quota is available and is valid for the prepayment proxy;

d) after the new quota has become available and valid, reporting by the prepayment proxy to the prepayment server the information regarding the used old quota and returning the remaining balance of the old quota to the prepayment server; and initializing the closure of the old Diameter online charging session also by the prepayment proxy; and e) closing the old Diameter online charging session by the old authenticator/prepayment client terminal.

In this method, the old quota is the quota allocated via the old prepayment client terminal, and the new quota is that allocated via the new prepayment client terminal.

The relocation of the prepayment client terminal can be accomplished in a push or pull mode between the old prepayment client terminal and the new prepayment client terminal. Furthermore, the re-authentication of the mobile station can comprise an extended authentication protocol stage and a PKMv2 3WHS stage.

After the detection that the re-authentication process has been successfully completed, the new prepayment client terminal initializes R4 relocation to accomplish a transaction process.

The R4 relocation which accomplishes the transaction process comprises: by way of transmitting a relocation_finish_request message, the new prepayment client terminal informs the old prepayment client terminal of the successful completion of the re-authentication process; the old prepayment client terminal responds with a relocation_finish_respond message; and the old prepayment client terminal deletes the context of the mobile station upon receiving a relocation_finish_confirmation message. In this case, the new prepayment client terminal sets an "online charging context" bit in the context objective indicators to indicate requesting the context of the old prepayment client terminal. Furthermore, the relocation_finish_respond message provides a mobile station context including the context of the old prepayment client terminal.

Before the prepayment proxy requests a new quota from the prepayment server via the new prepayment client terminal, the new prepayment client terminal transmits a context report message to the prepayment proxy so as to use the location/identification of the new prepayment client terminal to update the prepayment proxy.

BRIEF DESCRIPTION OF THE DRAWINGS

The present invention will be described herein below in detail in combination with the drawings, wherein.

DETAILED DESCRIPTION

Particular Embodiments

Figure 1:
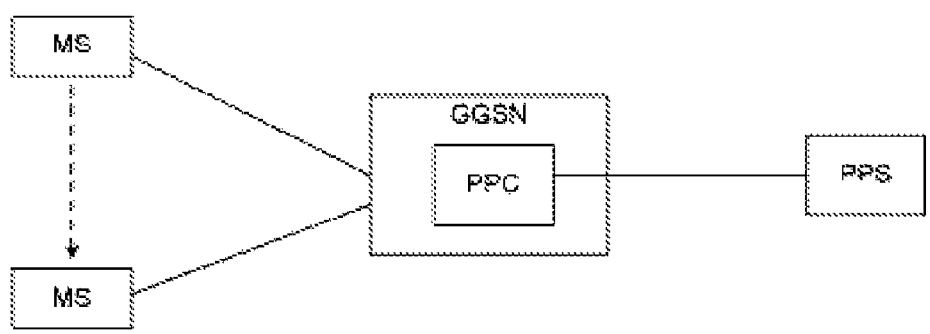
FIG. 1 illustrates a Diameter online charging architecture.
Figure 2:
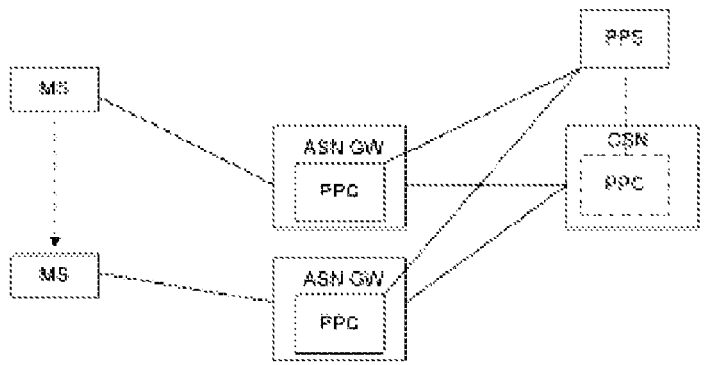
FIG. 2 illustrates a Diameter online charging architecture in a WiMAX network.
Figure 3:
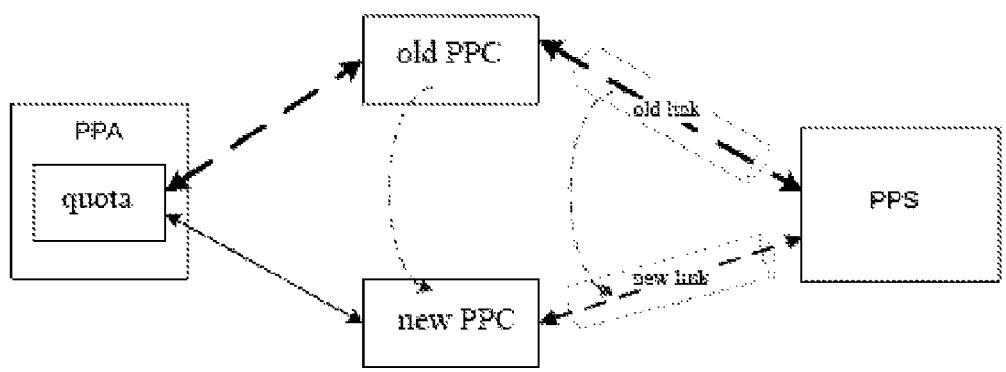
FIG. 3 illustrates a prepayment client terminal relocation plan used in a method of the present invention aiming at Diameter protocol-based online charging.

Based on the online charging architecture defined on the basis of WiMAX specifications, FIG. 3 illustrates a prepayment client terminal relocation plan used in a method of the present invention aiming at Diameter protocol-based online charging:

1. The context information of a Diameter session is transmitted from an old prepayment client terminal to a new prepayment client terminal. Further, the session will continue in the new link.

2. When the preset threshold of remaining quota is reached or the quota is used up, the prepayment proxy will start requesting a quota from the prepayment server via the new prepayment client terminal.

3. After the prepayment client terminal has been relocated, for a CCR message from the new prepayment client terminal to the prepayment server it shall comprise the "old session ID" which can be used for continuing the old Diameter online charging session. Two methods are defined here to indicate to the prepayment server that the message is the initial CCR message after the prepayment client terminal relocation, since the message is also used for continuing the session and it is different from the normal initializing message and updating message:

The first method is to define for the CCR a new message type (e.g. a CCR message type of "continuously charging") other than "initializing", "updating" and "finishing". When the prepayment server receives the message, it will know at once what the message is and will successfully complete the old session with the information in the message.

The second method is to use some special attribute value pair (AVP) to indicate that this is a special message after the relocation of the prepayment client terminal instead of defining a new CCR message type. In this way, if this AVP is applicable, then the AVP of the "old session ID" can also be used for this purpose simultaneously.

4. After the prepayment server has switched the Diameter session from the old connection to the new connection, the prepayment server breaks the old connections between the prepayment proxy, the old prepayment client terminal and the prepayment server.

Figure 4:
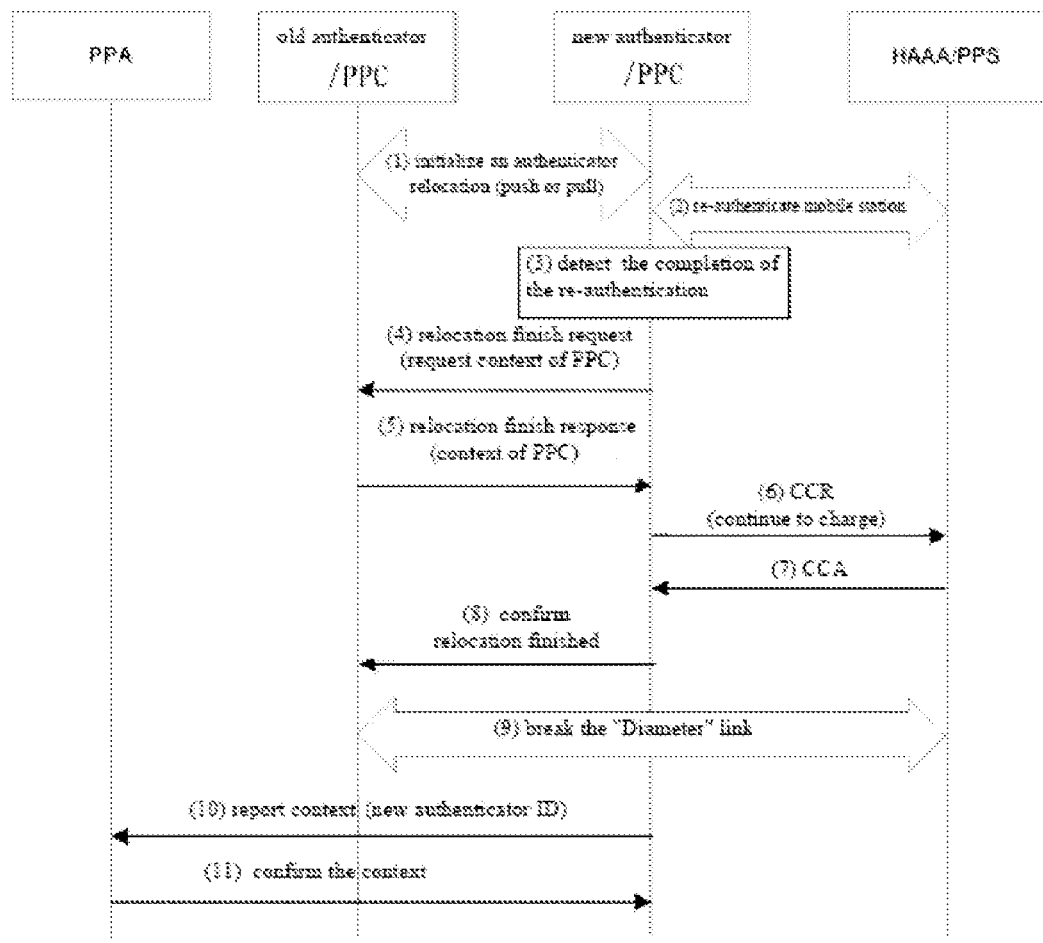
FIG. 4 illustrates a prepayment client terminal relocation process aiming at the plan as illustrated in FIG. 3.

Aiming at this plan, FIG. 4 illustrates the detailed process of the relocation of a prepayment client terminal. At Step 1, an authenticator relocation is initialized between the old authenticator/prepayment client terminal and the new authenticator/prepayment client terminal, which can be accomplished in a push or pull mode. At Step 2, the re-authentication of the mobile station is implemented in the new authenticator body. This comprises an extensible authentication protocol (EAP) stage and a PKMv2 3WHS stage. At Step 3, if the new authenticator/prepayment client terminal detects that the re-authentication process (the PKMv2 3WHS stage) has been successfully completed, the new authenticator/prepayment client terminal initializes R4 relocation to complete the transaction process. The R4 relocation to complete the transaction process comprises the following steps 4, 5 and 8. At Step 4, by way of transmitting a relocation_finish_respond message, the new authenticator/prepayment client terminal informs the old authenticator/prepayment client terminal of the successfully completed re-authentication process. The new authenticator/prepayment client terminal sets the "online charging context" bit in the context objective indicator TLV to indicate the request for the context of the old authenticator/prepayment client terminal. At Step 5, the old authenticator/prepayment client terminal responds with a relocation_finish_respond message, and the relocation_finish_respond message provides the mobile station context including the context of the old authenticator/prepayment client terminal. At Step 6, the new authenticator/prepayment client terminal starts a new session with the prepayment server, wherein a new quota is requested by transmitting a CCR (continuously charging) message. At Step 7, the prepayment server responds by using the new quota. At Step 8, the new authenticator/prepayment client terminal confirms having received the relocation_finish_respond message by transmitting a relocation_finish_confirm message. When the old authenticator/prepayment client terminal receives the message, the old authenticator/prepayment client terminal can delete the mobile station context. At Step 9, the Diameter link between the old authenticator/prepayment client terminal and the prepayment server is broken. At Step 10, the new authenticator/prepayment client terminal sends a context report message to the prepayment proxy so as to use the new authenticator location/identification/quota to update the prepayment proxy. From this moment, the prepayment proxy body transmits the quota update request to the new prepayment client terminal. At Step 11, the prepayment proxy responds by using the context confirmation message.

Figure 5:
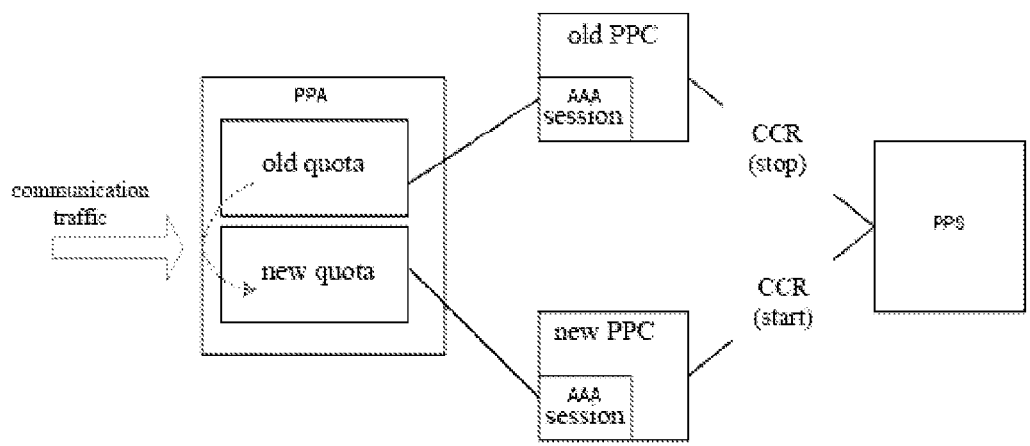
FIG. 5 illustrates a prepayment client terminal relocation plan used in another method of the present invention aiming at Diameter protocol-based online charging.

FIG. 5 illustrates a prepayment client terminal relocation plan used in another method of the present invention aiming at Diameter protocol-based online charging:

1. In the case of the relocation of a prepayment client terminal, a prepayment proxy (PPA) shall maintain the old quota and the new quota separately. The old quota is the quota allocated via the old prepayment client terminal, and the new quota is that allocated via the new prepayment client terminal.
2. The old quota shall be used for online charging until the new quota is available and is valid for the prepayment proxy so as to ensure the continuity of the user session.
3. After the new quota is available and valid, the prepayment proxy shall report the information of the used old quota to the prepayment server via the new prepayment client terminal, and if the remaining old quota is still available, the prepayment proxy shall return the remaining old quota to the prepayment server.

Figure 6:
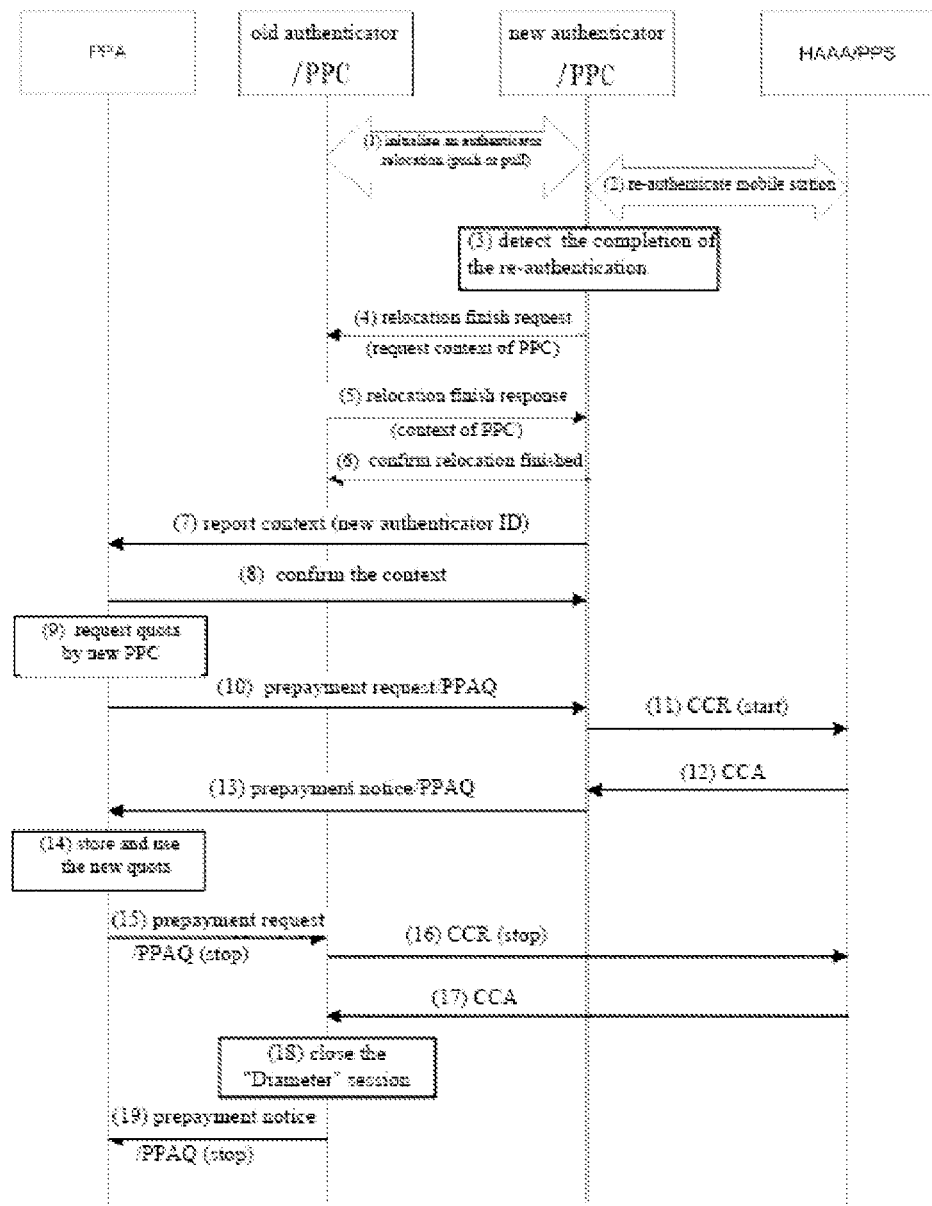
FIG. 6 illustrates a prepayment client terminal relocation process aiming at the plan as illustrated in FIG. 5.

Aimed at the plan illustrated in FIG. 5, FIG. 6 shows the detailed process of the relocation of a prepayment client terminal. At Step 1, an authenticator relocation is initialized between the old authenticator/prepayment client terminal and the new authenticator/prepayment client terminal, which can be accomplished in a push or pull mode. At Step 2, the re-authentication of the mobile station is implemented in the new authenticator body. This comprises an extensible authentication protocol (EAP) stage and a PKMv2 3WHS stage. At Step 3, if the new authenticator/prepayment client terminal detects that the re-authentication process has been successfully completed (the PKMv2 3WHS stage has been successfully completed), the new authenticator/prepayment client terminal initializes the R4 relocation to complete the transaction process. The R4 relocation to complete the transaction process comprises the following steps 4, 5 and 6. At Step 4, by transmitting a relocation_finish_respond message, the new authenticator/prepayment client terminal informs the old authenticator/prepayment client terminal of the successfully completed re-authentication process. The new authenticator/prepayment client terminal sets the "online charging context" bit among the context objective indicator TLV to indicate the request for the context of the prepayment client terminal. At Step 5, the old authenticator/prepayment client terminal responds with a relocation_finish_respond message, and the relocation_finish_respond message provides the mobile station context including the context of the prepayment client terminal. At Step 6, the new authenticator/prepayment client terminal confirms that the relocation_finish_respond message has been received by transmitting a relocation_finish_confirm message. When the old authenticator/prepayment client terminal receives the message, the old authenticator/prepayment client terminal can delete the mobile station context. At Step 7, the new authenticator/prepayment client terminal sends a context report message to the prepayment proxy so as to use the new authenticator location/identification in updating the prepayment proxy. From this moment, the prepayment proxy body transmits the quota update request to the new authenticator/prepayment client terminal. At Step 8, the prepayment proxy responds by using the context confirmation message. At Step 9, the prepayment proxy starts requesting a quota from the prepayment server. At Step 10, the prepayment proxy requests a new quota from the prepayment server via the new authenticator/prepayment client terminal so as to start a new prepayment session. At Step 11, the new authenticator/prepayment client terminal begins a new session with the prepayment server, wherein a new quota will be requested. At Step 12, the prepayment server responds by using the new quota. At Step 13, the new authenticator/prepayment client terminal transfers the new quota to the prepayment proxy. At Step 14, the prepayment proxy installs the new quota and closes the old quota which forms the old prepayment session. It shall be noted that the old quota and the new quota are managed separately in the prepayment proxy. At Step 15, the prepayment proxy initializes the closure of the old prepayment session. At Step 16, the old authenticator/prepayment client terminal initializes Diameter-related session closure toward the prepayment server. At Step 17, the prepayment server confirms the closure of the old prepayment session. At Step 18, the old authenticator/prepayment client terminal closes the prepayment context. At Step 19, the prepayment client terminal informs the prepayment proxy that the old prepayment client terminal has closed the prepayment session.

Although the present invention is described above in combination with a WiMAX network as an example, apparently the present invention is not limited as such, and it can be modified in many ways within the scope of the appended claims.

What is claimed is:

1. A method for maintaining continuity of Diameter online charging comprising:
   a) initializing, when a user is moving, the relocation of a prepayment client terminal from an old prepayment client terminal to a new prepayment client terminal and implementing the re-authentication of a mobile station at the new prepayment client terminal;
   b) transmitting the context information of an old Diameter online charging session from the old prepayment client terminal to the new prepayment client terminal after the re-authentication has been successfully completed;
   c) transmitting an initial credit control request message comprising the identification of the old Diameter online charging session from the new prepayment client terminal to a prepayment server for continuing the old Diameter online charging session, and request for a quota by the new prepayment client terminal to the prepayment server; and
   d) disconnecting the old connection between the old prepayment client terminal and the prepayment server.

2. The method as claimed in claim 1, characterized in that the initial credit control request message is indicated as a special message after the relocation of the prepayment client terminal by way of defining the type of the new credit control request message or by using a special attribute value pair.

3. The method as claimed in claim 2, characterized in that said type of the new credit control request message is "continuously charging".

4. The method as claimed in claim 1, characterized in that the relocation of the prepayment client terminal from the old prepayment client terminal to the new prepayment client terminal is accomplished in a push or pull mode.

5. The method as claimed in claim 1, characterized in that the re-authentication of the mobile station comprises an extended authentication protocol stage and a PKMv2 3WHS stage.

6. The method as claimed in claim 1, characterized in that after the detection that the re-authentication process has been successfully completed, the new prepayment client terminal initializes R4 relocation to accomplish a transaction process.

7. The method as claimed in claim 6, characterized in that by way of transmitting a relocation_finish_request message, the new prepayment client terminal informs the old prepayment client terminal of the successful completion of the re-authentication process; the old prepayment client terminal responds with a relocation_finish_respond message; and the old prepayment client terminal deletes the context of the mobile station upon receiving a relocation_finish_confirmation message.

8. The method as claimed in claim 7, characterized in that the new prepayment client terminal sets an "online charging context" bit in the context objective indicators to indicate requesting the context of the old prepayment client terminal.

9. The method as claimed in claim 7, characterized in that a relocation_finish_respond message provides a mobile station context including the context of the old prepayment client terminal.

10. The method as claimed in claim 1, characterized in that after the old connection between the old prepayment client terminal and the prepayment server has been disconnected, the new prepayment client terminal transmits a context report message to a prepayment proxy so as to use the location/identification/quota of the new prepayment client terminal to update the prepayment proxy.

* * * * *